US009794980B2

(12) United States Patent
Hwang et al.

(10) Patent No.: US 9,794,980 B2
(45) Date of Patent: Oct. 17, 2017

(54) RADIO RESOURCE CONTROL CONNECTION RELEASE MESSAGE WAIT TIMER

(75) Inventors: Woonhee Hwang, Espoo (FI); Andreas Bufe, Neuried (DE)

(73) Assignee: Nokia Solutions and Networks Oy, Espoo (FI)

( * ) Notice: Subject to any disclaimer, the term of this patent is extended or adjusted under 35 U.S.C. 154(b) by 342 days.

(21) Appl. No.: 13/249,472

(22) Filed: Sep. 30, 2011

(65) Prior Publication Data
US 2012/0082105 A1 Apr. 5, 2012

Related U.S. Application Data

(60) Provisional application No. 61/404,427, filed on Oct. 1, 2010.

(51) Int. Cl.
*H04W 76/06* (2009.01)
*H04W 76/04* (2009.01)

(52) U.S. Cl.
CPC .......... *H04W 76/06* (2013.01); *H04W 76/046* (2013.01)

(58) Field of Classification Search
USPC ............................................. 370/329, 395.4
See application file for complete search history.

(56) References Cited

U.S. PATENT DOCUMENTS

2004/0147266 A1* 7/2004 Hwang et al. ............... 455/445
2009/0247176 A1* 10/2009 Song et al. .................. 455/450
2010/0240367 A1* 9/2010 Lee et al. .................... 455/435.2
2010/0291939 A1* 11/2010 Jen ....................... H04W 76/028
455/450
2011/0081887 A1* 4/2011 Chakraborty et al. ........ 455/410

(Continued)

FOREIGN PATENT DOCUMENTS

CN 101547410 A 9/2009
CN 102238629 A 11/2011

(Continued)

OTHER PUBLICATIONS

3GPP TS 36.331 v9.1.0, Evolved Universal Terrestrial Radio Access Radio Resource Control, Dec. 2009.*

(Continued)

*Primary Examiner* — Tejis Daya
(74) *Attorney, Agent, or Firm* — Harrington & Smith

(57) ABSTRACT

Disclosed is a method that includes receiving, when in a radio resource control (RRC) Connected state, a RRC connection release message from a network access node; setting a wait timer in accordance with a wait timer indication that comprises part of the RRC connection release message; and upon an expiration of the wait timer, enabling the initiating of sending an RRC connection request message to the network access node. Also disclosed is a method that includes operating a network access node with mobile node and sending a RRC connection release message to the mobile node. The RRC connection release message comprises a wait timer indication for specifying an amount of time that the mobile node should wait before initiating the sending of a RRC connection request message. Various apparatus and computer programs stored on non-transitory computer-readable medium are disclosed that are configured to execute the methods.

20 Claims, 4 Drawing Sheets

(56) References Cited

U.S. PATENT DOCUMENTS

| | | | |
|---|---|---|---|
| 2011/0249575 A1* | 10/2011 | Dwyer et al. | 370/252 |
| 2011/0274040 A1* | 11/2011 | Pani et al. | 370/328 |
| 2012/0270570 A1* | 10/2012 | Claes et al. | 455/456.5 |
| 2013/0039287 A1* | 2/2013 | Rayavarapu et al. | 370/329 |

FOREIGN PATENT DOCUMENTS

| | | |
|---|---|---|
| CN | 102438280 A | 5/2012 |
| CN | 102448117 A | 5/2012 |
| JP | H0955461 A | 2/1997 |
| WO | WO 2009/062302 A1 | 5/2009 |
| WO | WO 2010/080056 A1 | 7/2010 |

OTHER PUBLICATIONS

3GPP TS 36.331 v9.1.0, 3rd Generation Partnership Project; Technical Specification Group Radio Access Network; Evolved Universal Terrestrial Radio Access (E-UTRA) Radio Resource Control (RRC); Protocol specification (Release 9); Dec. 2009.*

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.11.0, Dec. 2009, 148 pgs.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.3.0, Mar. 2010, 166 pgs.

"3$^{rd}$ Generation Partnership Project; Technical Specification Group Radio Access Network' Feasibility study for Further Advancements for E-UTRA (LTE-Advanced) (Release 9)", 3GPP TR 36.912 V9.2.0, Mar. 2010, 61 pgs.

"3$^{rd}$ Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913 V9.0.0, Dec. 2009, 15 pgs.

"3$^{rd}$ Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.3.0, Jun. 2010, 250 pgs.

3GPP TSG CT WG1 Meeting #55bis, Phoenix, Arizona (USA), Oct. 6-10, 2008, NTT Docomo, "Discussion about Cell Attempt Restriction in PS Domain", C1-083658, (5 pages).

3GPP TSG RAN WG2—LTE RRC Adhoc, Jun. 5-6, 2008, Sophia-Antipolis, France, Alcatel-Lucent, "Timer Value for RRC Connection Release", R2-082968, (4 pages).

3GPP TSG-RAN WG2 #62, Kansas City, USA May 5-9, 2008, Ericsson, "RRC Connection Release Timer", R2-082168, (5 pages).

R5-104133; Anite; "GCF Priority 3—Correction to EUTRA RRC test case 8.1.2.2"; 3GPP TSG RAN WG5 Meeting #48; Madrid, Aug. 23-27, 2010; pp. 7.

TD S2-101137; Samsung; "MTC Time Tolerant Feature"; 3GPP TSG SA WG2 Meeting #77; Feb. 22-26, 2010, San Francisco, USA. 3GPP TS 25.331 v8.8.0 (Sep. 2009); 3$^{rd}$ Generation Partnership Project; Technical Specification Group Radio Access Network; Radio Resource Control (RRC); Protocol Specification (Release 8); Relevant Sections are: 7, 8.1.4.1-8.1.4.3, 8.1.4.8-8.1.6.2.

* cited by examiner

RADIO RESOURCE CONTROL CONNECTION RELEASE MESSAGE WAIT TIMER

CLAIM OF PRIORITY FROM COPENDING PROVISIONAL PATENT APPLICATION

This patent application claims priority under 35 U.S.C. §119(e) from Provisional Patent Application No. 61/404,427, filed Oct. 1, 2010, the disclosure of which is incorporated by reference herein in its entirety.

TECHNICAL FIELD

The exemplary and non-limiting embodiments of this invention relate generally to wireless communication systems, methods, devices and computer programs and, more specifically, relate to radio resource control signaling between a mobile node and a network access node.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BS base station
DL downlink (eNB towards UE)
eNB E-UTRAN Node B (evolved Node B)
EPC evolved packet core
E-UTRAN evolved UTRAN (LTE)
FDMA frequency division multiple access
IMTA international mobile telecommunications association
ITU-R international telecommunication union-radiocommunication sector
LTE long term evolution of UTRAN (E-UTRAN)
LTE-A LTE advanced
MAC medium access control (layer 2, L2)
MM/MME mobility management/mobility management entity
NAS non-access stratum
NodeB base station
OFDMA orthogonal frequency division multiple access
O&M operations and maintenance
PDCP packet data convergence protocol
PHY physical (layer 1, L1)
Rel release
RLC radio link control
RRC radio resource control
RRM radio resource management
SGW serving gateway
SC-FDMA single carrier, frequency division multiple access
UE user equipment, such as a mobile station, mobile node or mobile terminal
UL uplink (HE towards eNB)
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LIE system. More recently, Release 9 versions of at least some of these specifications have been published including 3GPP TS 36.300, V9.3.0 (2010-03).

FIG. 1 reproduces FIG. 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control,
Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Also of interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9). Reference can also be made to 3GPP TR 36.912 V9.2.0 (2010-03) Technical Report 3rd Generation Partnership Project; Technical Specification Group Radio Access Network; Feasibility study for Further Advancements for E-UTRA (LTE-Advanced) (Release 9). A goal of LIE-A is to provide significantly enhanced services by means of higher data rates and lower latency with reduced cost. LTE-A is directed toward extending and optimizing the 3GPP LIE Rel-8 radio access technologies to provide higher data rates at lower cost. LTE-A will be a more optimized radio system fulfilling the ITU-R requirements for IMT-Advanced while keeping the backward compatibility with LTE Rel-8.

Of particular interest herein is 3GPP TS 36.331 V9.3.0 (2010-06) Technical Specification 3rd Generation Partnership Project; Technical Specification Group Radio Access Network; Evolved Universal Terrestrial Radio Access (E-UTRA); Radio Resource Control (RRC); Protocol specification (Release 9), in particular section 5.3.3, RRC connection establishment and section 5.3.8, RRC connection release. FIG. 3 herein reproduces FIG. 5.3.3.1-1: RRC connection establishment, successful; FIG. 4 herein reproduces FIG. 5.3.3.1-2: RRC connection establishment, network reject; and FIG. 5 herein reproduces FIG. 5.3.8.1-1: RRC connection release, successful, from 3GPP TS 36.331.

In the LTE system the RRC Connection Setup procedure includes the three messages shown in FIG. 3, i.e., RRCConnectionRequest, RRCConnectionSetup and RRCConnectionSetupComplete. In a case where the eNB can accept the RRC Connection Request sent from the UE when in the RRC Idle mode it responds with the RRC Connection Setup, and the UE becomes RRC Connected. On the other hand, if the eNB cannot accept the RRC Connection Request for some reason (e.g., congestion) the eNB replies with the RRCConnectionReject message shown in FIG. 4.

In RRC Connection Reject message the eNB can indicate to UE that it should wait a certain time before it re-tries another attempt to set up the RRC Connection. As is stated in section 5.3.3.8, the UE starts a timer T302 with the timer value set to the waitTime specified by the RRCConnectionReject message.

```
RRCConnectionReject-r8-IEs ::=    SEQUENCE {
    waitTime                      INTEGER (1..16),
    nonCriticalExtension          RRCConnectionReject-v8a0-IEs
                                  OPTIONAL
}
```

SUMMARY

In accordance with one aspect of the exemplary embodiments of this invention there is provided a method that comprises receiving, when in a radio resource control (RRC) Connected state, a RRC connection release message from a network access node; setting a wait timer in accordance with a wait timer indication that comprises part of the RRC connection release message; and upon an expiration of the wait timer, enabling the initiation of sending an RRC connection request message to the network access node.

In accordance with another aspect of the exemplary embodiments of this invention there is provided an apparatus that comprises at least one data processor and at least one memory including computer program code. The memory and computer program code are configured, with the processor, to cause the apparatus at least to receive, when in a radio resource control (RRC) Connected state, a RRC connection release message from a network access node, to set a wait timer of the apparatus in accordance with a wait timer indication that comprises part of the RRC connection release message and, upon an expiration of the wait timer, to enable an initiation of sending an RRC connection request message to the network access node.

In accordance with another aspect of the exemplary embodiments of this invention there is provided an apparatus that comprises timer means; means for receiving, when in a radio resource control (RRC) Connected state, a RRC connection release message from a network access node; means for setting said timer means in accordance with a wait timer indication that comprises part of the RRC connection release message; and means, responsive to an expiration of said timer means, for enabling the initiation of sending an RRC connection request message to the network access node.

In accordance with a further aspect of the exemplary embodiments of this invention there is provided a method that comprises operating a network access node with mobile node; and sending a radio resource control (RRC) connection release message to the mobile node, where the RRC connection release message comprises a wait timer indication for specifying an amount of time that the mobile node should wait before initiating the sending of a RRC connection request message.

In accordance with a still further aspect of the exemplary embodiments of this invention there is provided an apparatus that comprises at least one data processor and at least one memory including computer program code. The memory and computer program code are configured, with the processor, to cause the apparatus at least to send a radio resource control (RRC) connection release message to a mobile node, where the RRC connection release message comprises a wait timer indication for specifying an amount of time that the mobile node should wait before initiating the sending of a RRC connection request message.

DETAILED DESCRIPTION

Figure 5:
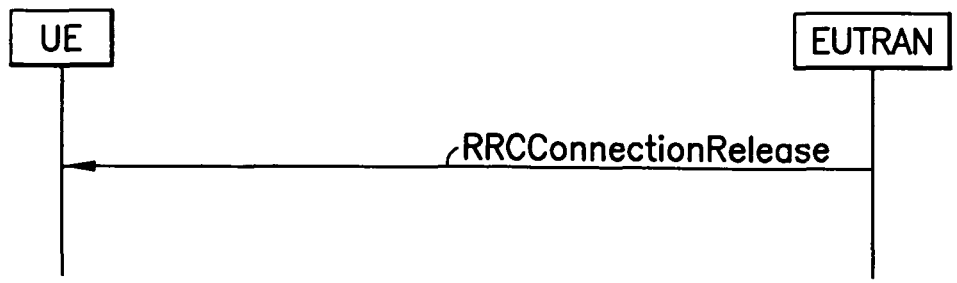
FIG. 5 reproduces FIG. 5.3.8.1-1: RRC connection release, successful, from 3GPP TS 36.331.

In some cases the eNB may not have sufficient information as to whether it should reject the RRC Connection Request when it receives RRCConnectionRequest message, and may not have this information until after it receives the RRCConnectionSetupComplete from the UE. If the eNB determines that for some reason it needs to release the RRC connection, it sends the RRCConnectionRelease message shown in FIG. 5. However, RRCConnectionRelease message does not have any means to indicate to the UE that it should wait for some certain time before attempting to again setup the RRC connected state. In one case the UE may not re-attempt a connection until triggered to do so by an application. In another case it may be that the UE will simply abort the non-access stratum (NAS) procedure and not re-attempt to send the RRCConnectionRequest message. The non-access stratum (NAS) forms the highest stratum of the control plane between UE and MME at the radio interface.

The exemplary embodiments of this invention overcome the problems discussed above by adding wait timer information to the RRCConnectionRelease message. In one embodiment the wait timer information explicitly specifies the wait timer duration, while in another embodiment the wait timer information implicitly specifies to the UE that it should set the wait timer at some predetermined value (e.g., one set by a standard protocol specification document). In either case, if the UE receives the wait timer information in the RRCConnectionRelease message it waits for the wait timer to expire before repeating the NAS procedure and sending another RRCConnectionRequest message into the same cell.

Figure 1:
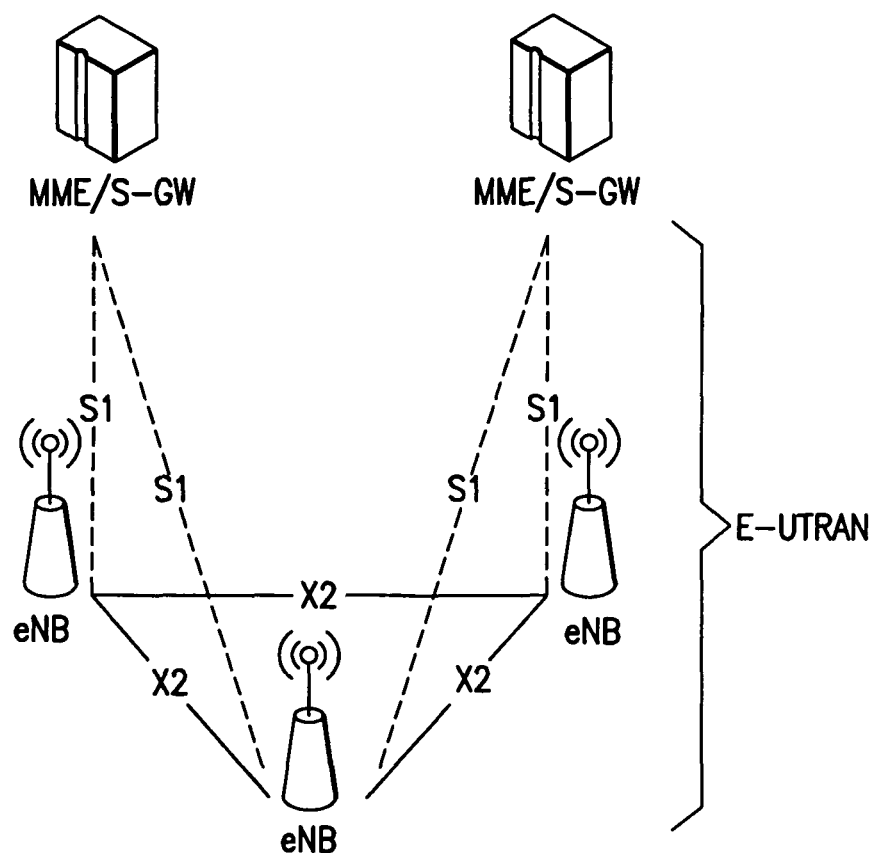
FIG. 1 reproduces FIG. 4.1 of 3GPP TS 36.300, and shows the overall architecture of the EUTRAN system.
Figure 2:
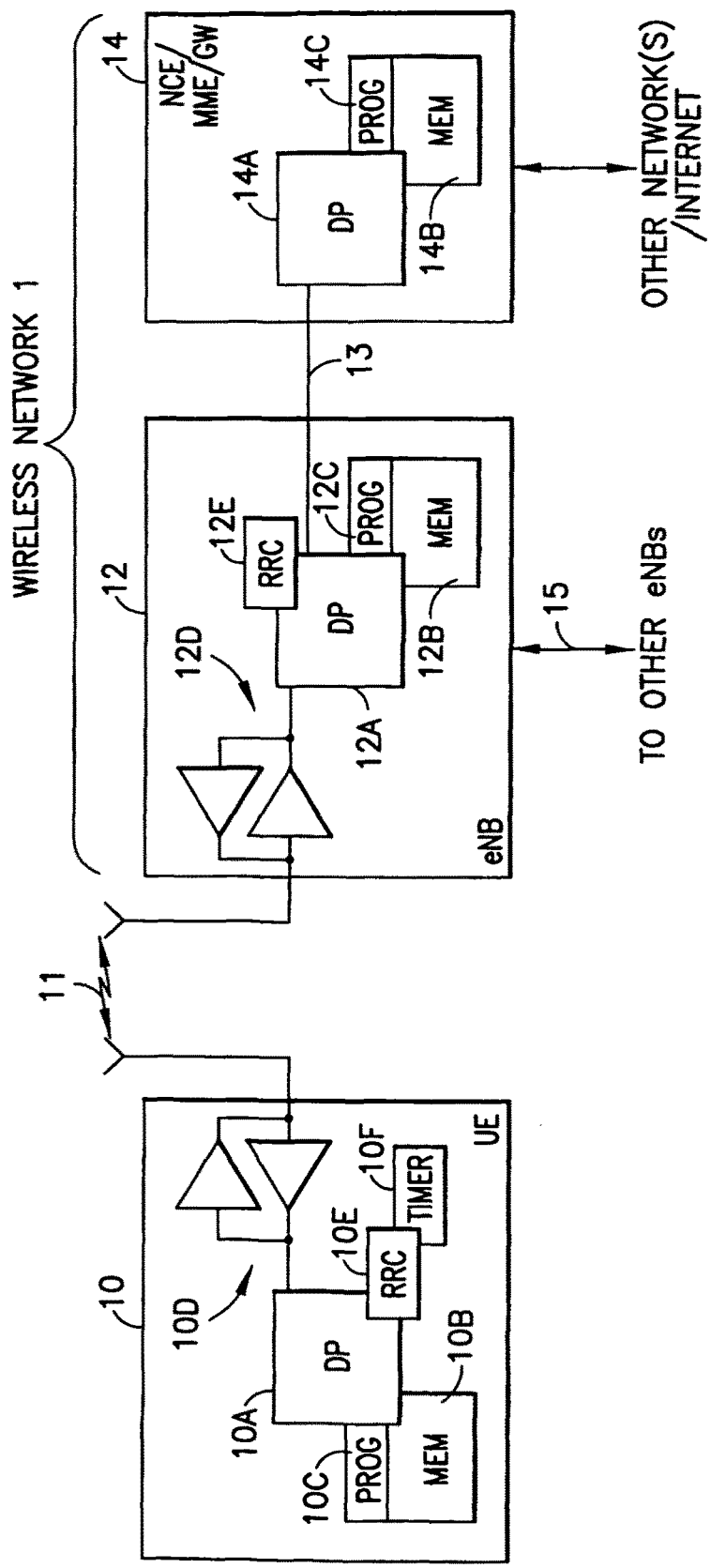
FIG. 2 shows a simplified block diagram of various electronic devices that are suitable for use in practicing the exemplary embodiments of this invention.
Figure 3:
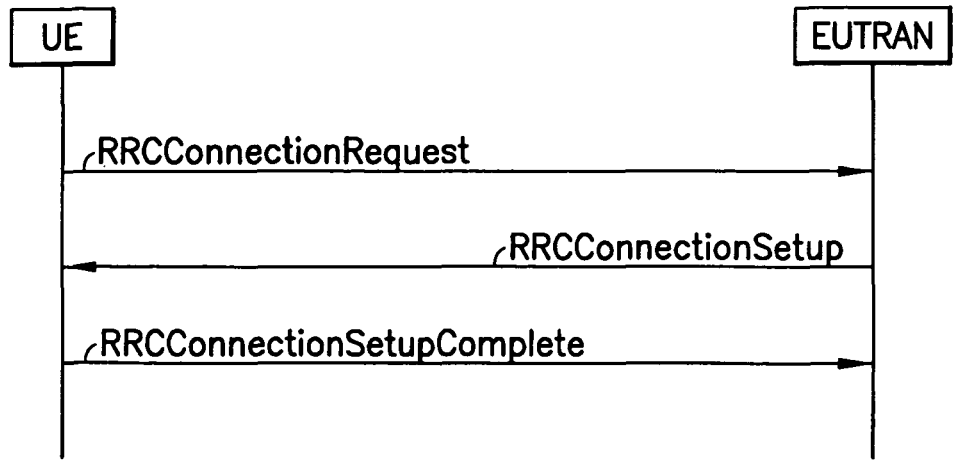
FIG. 3 reproduces FIG. 5.3.3.1-1: RRC connection establishment, successful, from 3GPP TS 36.331.
Figure 4:
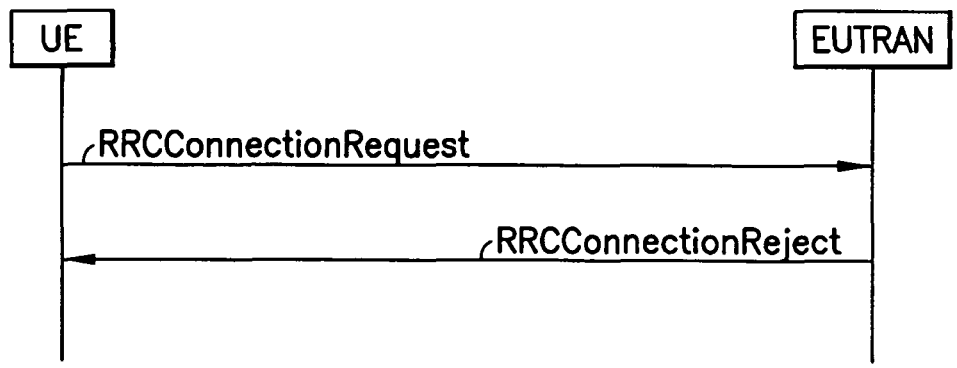
FIG. 4 reproduces FIG. 5.3.3.1-2: RRC connection establishment, network reject; from 3GPP TS 36.331.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a mobile node or as a UE 10, via a network access node, such as a Node B (base station), and more specifically an eNB 12. The network 1 may include a network control element (NCE) 14 that may include the MME/SGW functionality shown in FIG. 1, and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter/receiver pair (transceiver) 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1.

For the purposes of describing the exemplary embodiments of this invention the UE 10 may be assumed to include a RRC function or module 10E, and the eNB 12 also includes a RRC function or module 12E. The RRC functions 10E, 12E can be implemented in whole or in part as software embodied in the memories 10B, 12B.

Also associated with the UE 10 and the RRC function 10E is at least one timer (wait timer) 10F that can be set by the UE 10 based upon the wait timer information that is included in the RRCConnectionRelease message by the RRC function 12E of the eNB 12. The wait timer 10F can be implemented as a hardware timer, such as a register or a memory location that is incremented periodically, or as a software timer, or as a combination of hardware and software. The timer 10F could be polled by the data processor 10A to detect when it times-out, or it could generate an interrupt to the data processor 10A when it times out, as two non-limiting examples.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

Typically the first message the UE 10 sends to the network (eNB 12) to make the RRC signaling connection (i.e., the RRCConnectionRequest message) is small in size since the UE 10 uses a common (shared) channel (CCCH). Thus the information that the UE 10 can include is very limited. Therefore in some cases the eNB 12 does not know whether it has to accept the RRC Connection Request from UE 10 when it receives the RRCConnectionRequest message. In this case the eNB 12 can accept RRC Connection Request. However, once the eNB 12 receives further information in the RRCConnectionSetupComplete message and decides that the RRC Connection should not be accepted, it has to release the RRC Connection. Typically the RRCConnectionSetupComplete message is sent over a dedicated channel (DCCH) and the message size is less restricted than on the common channel.

For example, if machine-to-machine communication (device-to-device or D2D) is considered and the eNB 12 does not want to accept this type of communication for some reason (e.g., due to loading considerations), this type of information (i.e., machine-to-machine device-related) can be included in the RRCConnectionSetupComplete message instead of the RRCConnectionRequest message. Another example relates to a case where some specific MME is congested in the MME pool, and the eNB 12 only gains knowledge of the registered MME after receiving the RRCConnectionSetupComplete message (the UE 10 includes the registered MME information in the RRCConnectionSetupComplete message). Thus, in this case the eNB 12 has to release the RRC Connection if the MME which the UE 10 is trying to connect with, via the eNB 12, is congested.

In these exemplary cases the UE 10 should come back after some certain time so that it can check to determine whether the RRC Connection can be set up. However, according to the current standardization procedures the UE 10 would abort the NAS procedure, or repeat the NAS procedure (including a new signaling connection setup) too early for a machine-to-machine device.

The RRCConnectionRelease message could be defined is as follows:

| RRCConnectionRelease-r8-IEs ::= | SEQUENCE { |
| --- | --- |
| releaseCause | ReleaseCause, |
|    redirectedCarrierInfo | RedirectedCarrierInfo OPTIONAL |
|    idleModeMobilityControlInfo | IdleModeMobilityControlInfo OPTIONAL |
|    nonCriticalExtension | RRCConnectionRelease-v890-IEs OPTIONAL |
| }. | |

One possible implementation in accordance with the exemplary embodiments of this invention adds wait timer information in the extension portion of this message so that the network (the RRC function 12E of the eNB 12) can explicitly signal the wait timer value, e.g.:
waitTime INTEGER (1..xx).

If UE 10 receives the waitTime value in the RRCConnectionRelease message it sets the timer 10F according to the value expressed by INTEGER (1..xx) and then waits until the timer 10F expires. When this occurs the UE 10 informs the NAS layer and the NAS triggers another attempt to setup the signaling bearer by sending the RRCConnectionRequest message.

Another possible implementation of the exemplary embodiments adds a new cause value in the ReleaseCause information element (IE) to which the UE 10 responds, when it receives this indication from the RRCConnectionRelease message, by starting the timer 10F with some fixed value (e.g., one pre-established by standardization) and then by waiting until the timer 10F expires. At this time the UE 10 informs the NAS layer and the NAS triggers another attempt to setup the signaling bearer by sending the RRCConnectionRequest message.

In this latter embodiment the predetermined timer value may be stored as part of the software of the UE 10, or it may be received from the eNB 12 in system information signaling (and thus possibly changed by the eNB 12 in subsequent eNB system information signaling).

Based on the foregoing it should be apparent that the exemplary embodiments of this invention provide a method, apparatus and computer program(s) to enhance UE/network operation when a RRCConnectionRelease message is sent to the UE 10.

Figure 6:
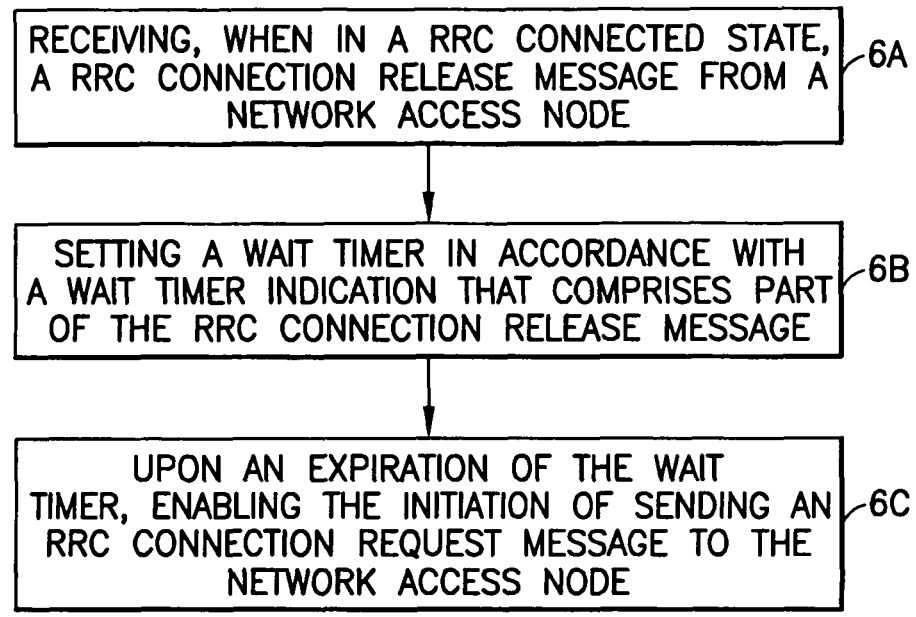
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, a step of receiving, when in a RRC Connected state, a RRC connection release message from a network access node. At Block 6B there is a step of setting a wait timer in accordance with a wait timer indication that comprises part of the RRC connection release message. At Block 6C there is a step executed upon an expiration of the wait timer of enabling the initiation of sending an RRC connection request message to the network access node.

In the method of FIG. 6, where the wait timer indication is received in an information element that explicitly defines a duration of the setting for the wait timer.

In the method of FIG. 6, where the wait timer indication is received as information that implicitly defines a duration of the setting for the wait timer.

In the method of the preceding paragraph where the information comprises part of a release cause indication, and where the wait timer is set to a predetermined value.

The exemplary embodiments also pertain to a non-transitory computer-readable medium that contains software program instructions, where execution of the software program instructions by at least one data processor results in performance of operations that comprise execution of the method of FIG. 6 and the several related preceding paragraphs.

Figure 7:
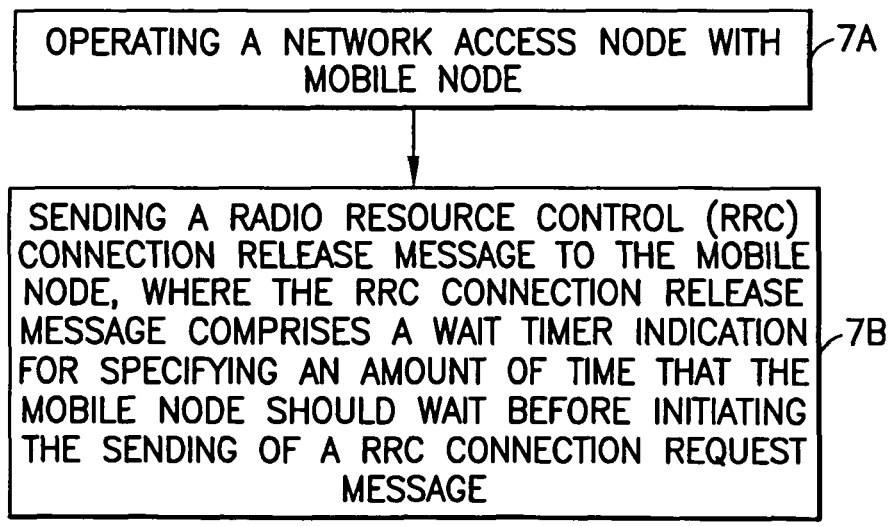
FIG. 7 is a logic flow diagram that illustrates the operation of a method, and a result of execution of computer program instructions embodied on a computer readable memory, further in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, a step of operating a network access node with mobile node and, at Block 7B, a step of sending a radio resource control (RRC) connection release message to the mobile node, where the RRC connection release message comprises a wait timer indication for specifying an amount of time that the mobile node should wait before initiating the sending of a RRC connection request message.

In the method of FIG. 7, where the wait timer indication is included in an information element that explicitly defines a duration of the setting for the wait timer.

In the method of FIG. 7, where the wait timer indication is sent as information that implicitly defines a duration of the setting for the wait timer.

In the method of FIG. 7, where the wait timer indication is sent in a release cause indication.

The exemplary embodiments also pertain to a non-transitory computer-readable medium that contains software program instructions, where execution of the software program instructions by at least one data processor results in performance of operations that comprise execution of the method FIG. 7 and the several paragraphs descriptive of FIG. 7.

The various blocks shown in FIGS. 6 and 7 may be viewed as method steps, and/or as operations that result from operation of computer program code, and/or as a plurality of coupled logic circuit elements constructed to carry out the associated function(s).

The exemplary embodiments thus also encompass an apparatus that comprises a processor and a memory including computer program code. The memory and computer program code are configured to, with the processor, cause the apparatus at least to receive, when in a RRC Connected state, a RRC connection release message from a network access node, to set a wait timer in accordance with a wait timer indication that comprises part of the RRC connection release message and, upon an expiration of the wait timer, to enable the initiation of sending an RRC connection request message to the network access node.

The exemplary embodiments also encompass an apparatus that comprises means for receiving, when in a RRC Connected state, a RRC connection release message from a network access node, means for setting a wait timer in accordance with a wait timer indication that comprises part of the RRC connection release message and means, responsive to an expiration of the wait timer, for enabling the initiation of sending an RRC connection request message to the network access node.

The exemplary embodiments also encompass a method, apparatus, and computer program code for sending a RRC connection release message to a mobile node, where the RRC connection release message comprises a wait timer indication for specifying an amount of time that the mobile node should wait before initiating the sending of a RRC connection request message.

In the method, apparatus, and computer program code of the preceding paragraph, where the wait timer indication is included in an information element that explicitly defines a duration of the setting for the wait timer, or is sent as information that implicitly defines a duration of the setting for the wait timer, such as in a release cause indication.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN LTE and LTE-A systems, it should be appreciated that the exemplary embodiments of this invention are not limited for use with only these particular types of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., waitTime, etc.) are not intended to be limiting in any respect, as these parameters may be identified by any suitable names. Further, the various names assigned to different channels (e.g., CCCH, DCCH, etc.) and protocol layers (e.g., RRC) are not intended to be limiting in any respect, as these various channels and protocol layers may be identified by any suitable names. Further still, the various names used for the described messages (e.g., RRCConnectionRelease, etc.) are not intended to be limiting in any respect, as these messages may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   sending, related to a non-access stratum (NAS) procedure, an RRC connection setup complete message;
   receiving, in response to the RRC connection setup complete message, when in a radio resource control (RRC) Connected state in an evolved universal terrestrial radio access network, an RRC connection release message from a network access node;
   aborting the non-access stratum (NAS) procedure;
   setting a wait timer in accordance with a wait timer indication that comprises part of the RRC connection release message; and
   upon an expiration of the wait timer, repeating the non-access stratum (NAS) procedure and enabling the initiation of sending an RRC connection request message to the network access node.

2. The method of claim 1, where the wait timer indication is received in an information element that explicitly defines a duration of a setting for the wait timer.

3. The method of claim 1, where the wait timer indication is received as information that implicitly defines a duration of a setting for the wait timer.

4. A non-transitory computer-readable medium that contains software program instructions, where execution of the software program instructions by at least one data processor results in performance of operations that comprise execution of the method of claim 1.

5. An apparatus comprising:
   at least one data processor; and
   at least one memory including computer program code, wherein the memory and computer program code are configured, with the processor, to cause the apparatus at least to:
   send, related to a non-access stratum (NAS) procedure, an RRC connection setup complete message;
   receive, in response to the RRC connection setup complete message, when in a radio resource control (RRC) Connected state in an evolved universal terrestrial radio access network, an RRC connection release message from a network access node;
   abort the non-access stratum (NAS) procedure;

set a wait timer of the apparatus in accordance with a wait timer indication that comprises part of the RRC connection release message; and, upon an expiration of the wait timer, repeat the non-access stratum (NAS) procedure and enable an initiation of sending an RRC connection request message to the network access node.

6. The apparatus of claim 5, where the wait timer indication is received in an information element that explicitly defines a duration of a setting for the wait timer.

7. The apparatus of claim 5 where the wait timer indication is received as information that implicitly defines a duration of a setting for the wait timer.

8. The apparatus of claim 7, where the information comprises part of a release cause indication, and where the wait timer is set to a predetermined value.

9. A method comprising:

receiving, related to a non-access stratum (NAS) procedure, an RRC connection setup complete message from a user equipment in an evolved universal terrestrial radio access network;

sending, in response to the RRC connection setup complete message, an RRC connection release message to the user equipment, wherein the RRC connection release message comprises a wait timer indication for specifying an amount of time that the user equipment should wait after aborting the non-access stratum (NAS) procedure for repeating the non-access stratum (NAS) procedure and enabling the initiation of sending an RRC connection request message.

10. The method of claim 9, where the wait timer indication is included in an information element that explicitly defines a duration of the setting for the wait timer.

11. The method of claim 9, where the wait timer indication is sent as information that implicitly defines a duration of the setting for the wait timer.

12. A non-transitory computer-readable medium that contains software program instructions, where execution of the software program instructions by at least one data processor results in performance of operations that comprise execution of the method of claim 9.

13. An apparatus comprising:
at least one data processor; and
at least one memory including computer program code, wherein the memory and computer program code are configured, with the processor, to cause the apparatus at least to:

receive, related to a non-access stratum (NAS) procedure, an RRC connection setup complete message from a user equipment in an evolved universal terrestrial radio access network;

send, in response to the RRC connection setup complete message, an RRC connection release message to the user equipment, wherein the RRC connection release message comprises a wait timer indication for specifying an amount of time that the user equipment should wait after aborting the non-access stratum (NAS) procedure for repeating the non-access stratum (NAS) procedure and enabling the initiation of sending an RRC connection request message.

14. The apparatus of claim 13, where the wait timer indication is included in an information element that explicitly defines a duration of the setting for the wait timer.

15. The apparatus of claim 13, where the wait timer indication is sent as information that implicitly defines a duration of the setting for the wait timer.

16. The apparatus of claim 13, where the wait timer indication is sent in a release cause indication.

17. The method of claim 1, wherein the RRC connection setup complete message comprises information indicative of the type of communication of a user equipment.

18. The apparatus of claim 5, wherein the RRC connection setup complete message comprises information indicative of the type of communication of a user equipment.

19. The method of claim 9, wherein the RRC connection setup complete message comprises information indicative of the type of communication of a user equipment.

20. The apparatus of claim 13, wherein the RRC connection setup complete message comprises information indicative of the type of communication of a user equipment.

* * * * *